US012657510B2

(12) United States Patent
Guzik et al.

(10) Patent No.: US 12,657,510 B2
(45) Date of Patent: Jun. 16, 2026

(54) DYNAMIC MULTI-TENANT DATA PLATFORM FOR MACHINE LEARNING MODELING AND VISUALIZATION

(71) Applicant: S&P Global Inc., New York, NY (US)

(72) Inventors: Stanley Guzik, Ridgewood, NJ (US);
Prashant Desai, Princeton, NJ (US);
Anthony Sweet, Aurora, CO (US);
Anubhav Agarwal, Brooklyn, NY (US); Gary Jones, London (GB);
Sunny Francis, Hyderabad (IN);
Debaprasad Satapathy, Hyderabad (IN)

(73) Assignee: S&P Global Inc., New York, NY (US)

( * ) Notice: Subject to any disclaimer, the term of this patent is extended or adjusted under 35 U.S.C. 154(b) by 1058 days.

(21) Appl. No.: 17/664,896

(22) Filed: May 25, 2022

(65) Prior Publication Data
US 2023/0409954 A1     Dec. 21, 2023

(51) Int. Cl.
*G06F 16/00*          (2019.01)
*G06N 20/00*          (2019.01)

(52) U.S. Cl.
CPC .................................... *G06N 20/00* (2019.01)

(58) Field of Classification Search
CPC ....................... G06F 16/3322; G06F 16/90324
See application file for complete search history.

(56) References Cited

U.S. PATENT DOCUMENTS

| | | | | |
|---|---|---|---|---|
| 8,903,995 B1 * | 12/2014 | Basak | .................... | H04L 43/08 |
| | | | | 709/224 |
| 11,720,813 B2 * | 8/2023 | Babu | ..................... | G06N 20/20 |
| | | | | 706/12 |
| 2011/0264642 A1 * | 10/2011 | Mital | .................... | G16H 50/70 |
| | | | | 707/706 |
| 2020/0250587 A1 * | 8/2020 | Aerni | ..................... | G06N 5/043 |
| 2020/0371509 A1 * | 11/2020 | Mark | ................ | G05B 19/4155 |
| 2021/0073028 A1 * | 3/2021 | Li | .......................... | G06F 9/5044 |
| 2021/0142118 A1 * | 5/2021 | Lugt | ................ | G06F 18/24765 |
| 2021/0142206 A1 * | 5/2021 | Ghanea-Hercock | ......................... | |
| | | | | G06F 21/602 |
| 2021/0397999 A1 * | 12/2021 | Bernat | ................ | G06F 11/3442 |
| 2022/0067626 A1 * | 3/2022 | Unnikrishnan | .. | G06Q 10/06375 |
| 2022/0414548 A1 * | 12/2022 | Ashrafzadeh | ........... | G06F 18/25 |

(Continued)

OTHER PUBLICATIONS

Swapnil Narlawar, Enterprise Data Integration: A Case Study Analysis of Multi-Tenant Platforms Enabling Cross-Domain Analytics, JCSTS, 10 pages (Year: 2025).*

*Primary Examiner* — Noosha Arjomandi
(74) *Attorney, Agent, or Firm* — Yee & Associates, P.C.

(57)          ABSTRACT

A method, apparatus, system, and computer program code for dynamically modeling multi-tenant data in a machine learning platform. A recommendation engine receives a first data set from a user. The recommendation engine characterizes the first data set to determine data attributes and data characteristics of the first data set. The recommendation engine aligns the data attributes of the first data set with a second data set according to an ontology. Based on the data characteristics of the first data set, the recommendation engine identifies a set of pre-trained models that was trained from training parameters selected from data attributes and data characteristics of a second data set. The recommendation engine recommends the set of pre-trained models to the user.

24 Claims, 8 Drawing Sheets

(56) References Cited

U.S. PATENT DOCUMENTS

| | | | |
|---|---|---|---|
| 2023/0237321 A1* | 7/2023 | Cirillo | G06N 3/0895 |
| | | | 706/15 |
| 2023/0245651 A1* | 8/2023 | Wang | G06N 5/022 |
| | | | 704/275 |
| 2023/0334145 A1* | 10/2023 | Venkataraman | G06F 21/56 |
| 2023/0377023 A1* | 11/2023 | Buzzell | G06Q 30/0641 |
| 2023/0409954 A1* | 12/2023 | Guzik | G06N 3/0455 |
| 2024/0386119 A1* | 11/2024 | Cooper | G06F 21/6218 |
| 2025/0352907 A1* | 11/2025 | Crabtree | A63F 13/355 |

* cited by examiner

ARCHITECTURE
300

316        316        316

| CONTEXTUALIZED REPRESENTATION | CONTEXTUALIZED REPRESENTATION | o o o | CONTEXTUALIZED REPRESENTATION |

314        314        314

DECODER     o o o     DECODER     o o o     DECODER

TRANSFORMER     o o o     TRANSFORMER     o o o     TRANSFORMER 312        312        312

310   EMBEDDING    EMBEDDING   o o o   EMBEDDING   310

310

CLASS LABEL

MODEL
400

| C | $T_1$ | $T_2$ | o o o | $T_N$ |

TRANSFORMER LANGUAGE MODEL

| $E_{CLS}$ | $E_1$ | $E_2$ | o o o | $E_N$ |

| CLS | TOK 1 | TOK 2 | o o o | TOK N |

SINGLE SENTENCE

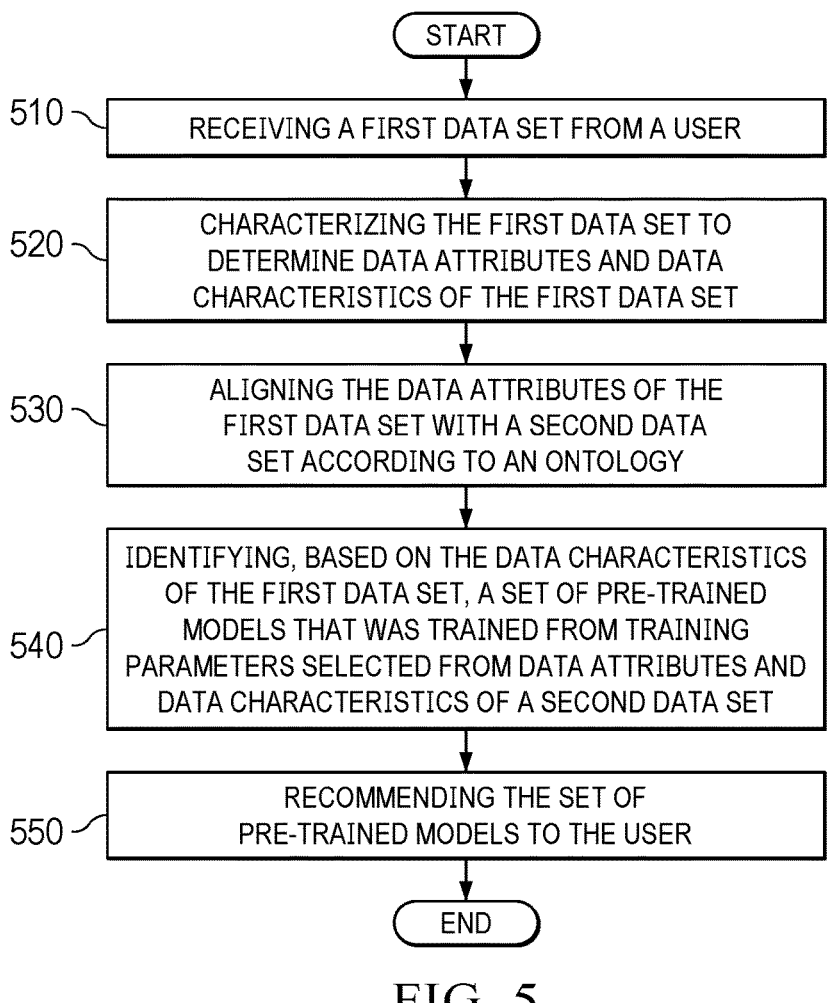

510 — RECEIVING A FIRST DATA SET FROM A USER

520 — CHARACTERIZING THE FIRST DATA SET TO DETERMINE DATA ATTRIBUTES AND DATA CHARACTERISTICS OF THE FIRST DATA SET

530 — ALIGNING THE DATA ATTRIBUTES OF THE FIRST DATA SET WITH A SECOND DATA SET ACCORDING TO AN ONTOLOGY

540 — IDENTIFYING, BASED ON THE DATA CHARACTERISTICS OF THE FIRST DATA SET, A SET OF PRE-TRAINED MODELS THAT WAS TRAINED FROM TRAINING PARAMETERS SELECTED FROM DATA ATTRIBUTES AND DATA CHARACTERISTICS OF A SECOND DATA SET

550 — RECOMMENDING THE SET OF PRE-TRAINED MODELS TO THE USER

FIG. 5

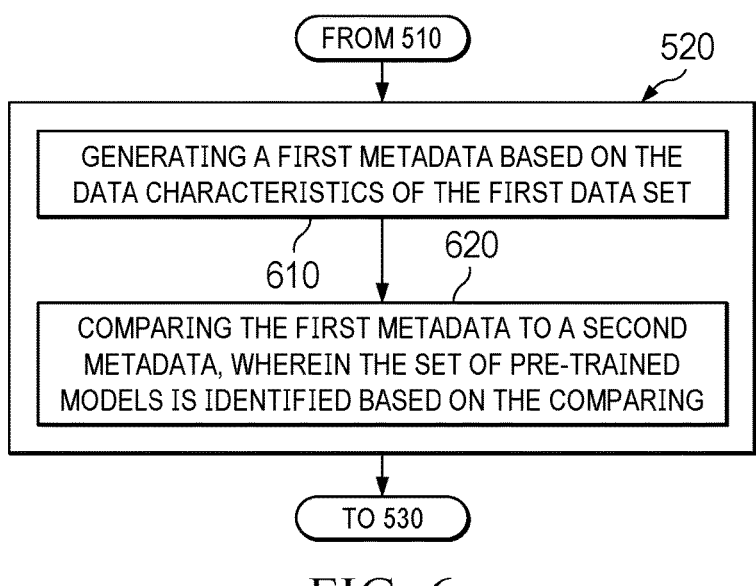

FROM 510

520

GENERATING A FIRST METADATA BASED ON THE DATA CHARACTERISTICS OF THE FIRST DATA SET

610

620

COMPARING THE FIRST METADATA TO A SECOND METADATA, WHEREIN THE SET OF PRE-TRAINED MODELS IS IDENTIFIED BASED ON THE COMPARING

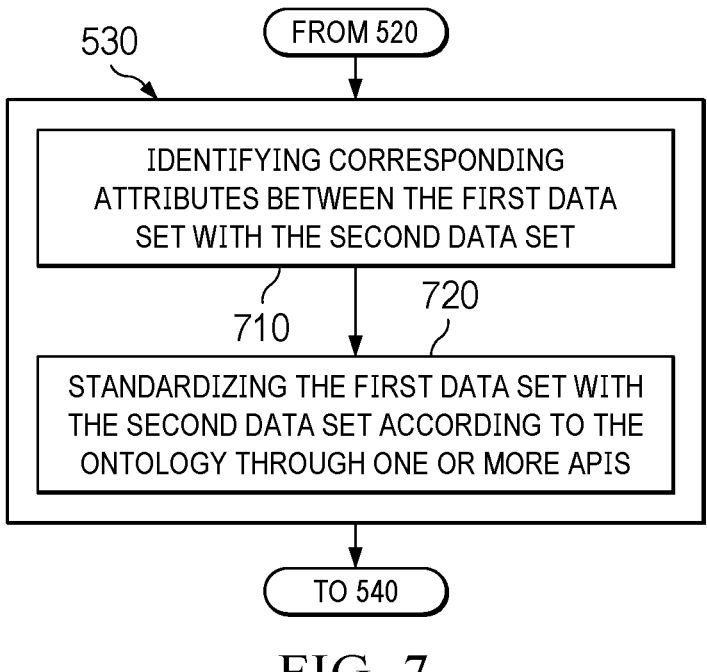

530

FROM 520

IDENTIFYING CORRESPONDING ATTRIBUTES BETWEEN THE FIRST DATA SET WITH THE SECOND DATA SET

710

720

STANDARDIZING THE FIRST DATA SET WITH THE SECOND DATA SET ACCORDING TO THE ONTOLOGY THROUGH ONE OR MORE APIS

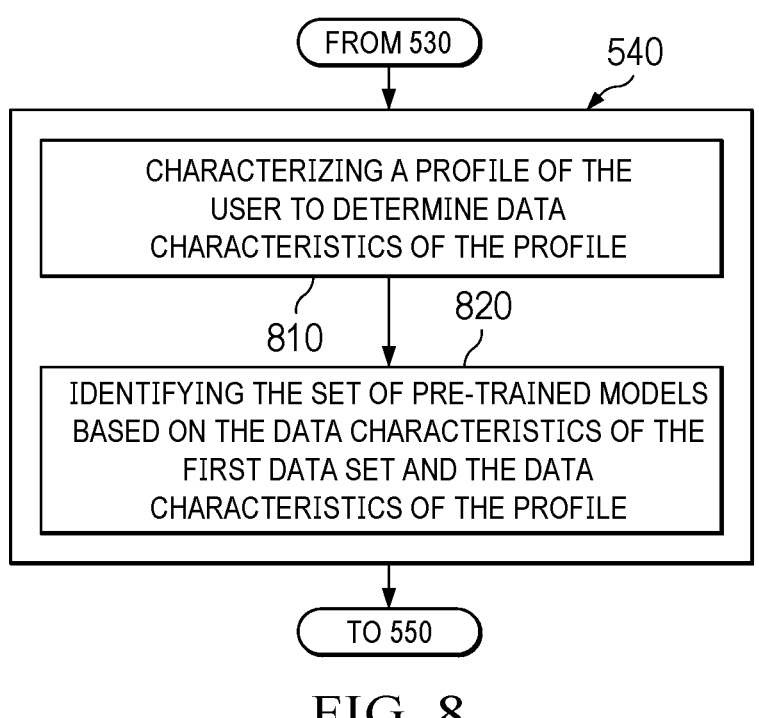

FROM 530

540

CHARACTERIZING A PROFILE OF THE USER TO DETERMINE DATA CHARACTERISTICS OF THE PROFILE

810

820

IDENTIFYING THE SET OF PRE-TRAINED MODELS BASED ON THE DATA CHARACTERISTICS OF THE FIRST DATA SET AND THE DATA CHARACTERISTICS OF THE PROFILE

FROM 1020

1110 — IN RESPONSE TO DETERMINING THAT THE MODEL DOES NOT PERFORM TO A DESIRED LEVEL OF ACCURACY, PERFORMING ONE OR MORE REMEDIATIONS

1120 — FURTHER TRAINING THE MODEL THAT WAS SELECTED ACCORDING TO A SECOND PORTION OF THE FIRST DATA SET

1130 — RECOMMENDING ONE OR MORE ALTERNATIVE TRAINING PARAMETERS BASED ON THE DATA CHARACTERISTICS OF THE DATA SET

1140 — RECOMMENDING ONE OR MORE ALTERNATIVE MODELS

1150 — FURTHER TRAINING THE ONE OR MORE ALTERNATIVE MODEL ACCORDING TO THE SECOND PORTION OF THE FIRST DATA SET

1160 — RECOMMENDING ONE OR MORE ALTERNATIVE VISUALIZATIONS

END

FIG. 11

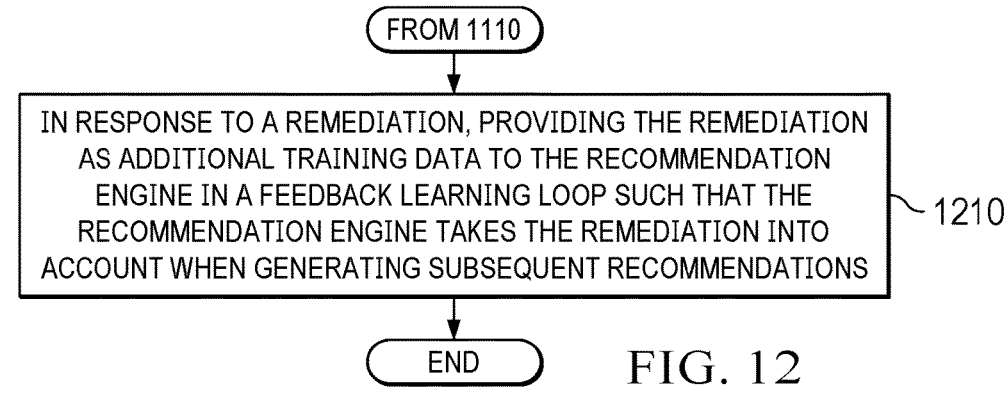

FROM 1110

IN RESPONSE TO A REMEDIATION, PROVIDING THE REMEDIATION AS ADDITIONAL TRAINING DATA TO THE RECOMMENDATION ENGINE IN A FEEDBACK LEARNING LOOP SUCH THAT THE RECOMMENDATION ENGINE TAKES THE REMEDIATION INTO ACCOUNT WHEN GENERATING SUBSEQUENT RECOMMENDATIONS — 1210

END     FIG. 12

DYNAMIC MULTI-TENANT DATA PLATFORM FOR MACHINE LEARNING MODELING AND VISUALIZATION

BACKGROUND

1. Field

The disclosure relates generally to an improved computer system and, more specifically, to a method, apparatus, computer system, and computer program product for dynamically modeling multi-tenant data in a machine learning platform.

2. Description of the Related Art

Machine learning involves using machine learning algorithms to build machine learning models based on samples of data. The samples of data used for training referred to as training data or training datasets. Machine learning models trained using training datasets and make predictions without being explicitly programmed to make these predictions. Machine learning models can be trained for a number of different types of applications. These applications include, for example, medicine, healthcare, speech recognition, computer vision, or other types of applications.

These machine learning algorithms can include supervised machine learning algorithms and unsupervised machine learning algorithms. Supervised machine learning can train machine learning models using data containing both the inputs and desired outputs.

SUMMARY

According to one embodiment of the present invention, a method provides for dynamically modeling multi-tenant data in a machine learning platform. The method comprises: receiving, by a recommendation engine, a first data set from a user; characterizing, by the recommendation engine, the first data set to determine data attributes and data characteristics of the first data set; aligning the data attributes of the first data set with a second data set according to an ontology; identifying, by the recommendation engine based on the data characteristics of the first data set, a set of pre-trained models that was trained from training parameters selected from data attributes and data characteristics of a second data set; and recommending, by the recommendation engine, the set of pre-trained models to the user.

According to another embodiment of the present invention, a computer system comprises a storage device configured to store program instructions for dynamically modeling multi-tenant data in a machine learning platform, and one or more processors operably connected to the storage device and configured to execute the program instructions to cause the system to: receive a first data set from a user; characterize the first data set to determine data attributes and data characteristics of the first data set; align the data attributes of the first data set with a second data set according to an ontology; identify, based on the data characteristics of the first data set, a set of pre-trained models that was trained from training parameters selected from data attributes and data characteristics of a second data set; and recommend the set of pre-trained models to the user.

According to yet another embodiment of the present invention, a computer program product comprises a computer-readable storage media with program code stored on the computer-readable storage media for dynamically modeling multi-tenant data in a machine learning platform. The program code is executable by a computer system to perform the method of: receiving a first data set from a user; characterizing the first data set to determine data attributes and data characteristics of the first data set; aligning the data attributes of the first data set with a second data set according to an ontology; identifying, based on the data characteristics of the first data set, a set of pre-trained models that was trained from training parameters selected from data attributes and data characteristics of a second data set; and recommending the set of pre-trained models to the user.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is a flowchart of a process for dynamically modeling multi-tenant data in a machine learning platform in accordance with an illustrative embodiment;

FIG. 6 is a flowchart of a process for characterizing a first data set in accordance with an illustrative embodiment;

FIG. 7 is a flowchart of a process for aligning data attributes of a first data set with a second data set in accordance with an illustrative embodiment;

FIG. 8 is a flowchart of a process for identifying a set of pre-trained models in accordance with an illustrative embodiment;

FIG. 11 is a flowchart of a process for in response performing remediations for an underperforming model in accordance with an illustrative embodiment;

FIG. 12 is a flowchart of a process for providing additional training data to a recommendation engine in accordance with an illustrative embodiment.

DETAILED DESCRIPTION

The illustrative embodiments recognize and take into account one or more different considerations. For example, the illustrative embodiments recognize and take into account that identifying appropriate machine learning models, training parameters, and visualizations to showcase insights into particular data set can be confusing to novice users.

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that provides an end-to-end data platform with an initial data schema to allow multiple users to each bring in proprietary data to use as input for machine learning training models. Further, the illustrative embodiments recognize and take into account that it would be desirable for users to train its model within the platform while relying on the platform to provide benchmarking analysis to avoid overfitted with training data.

Figure 1:
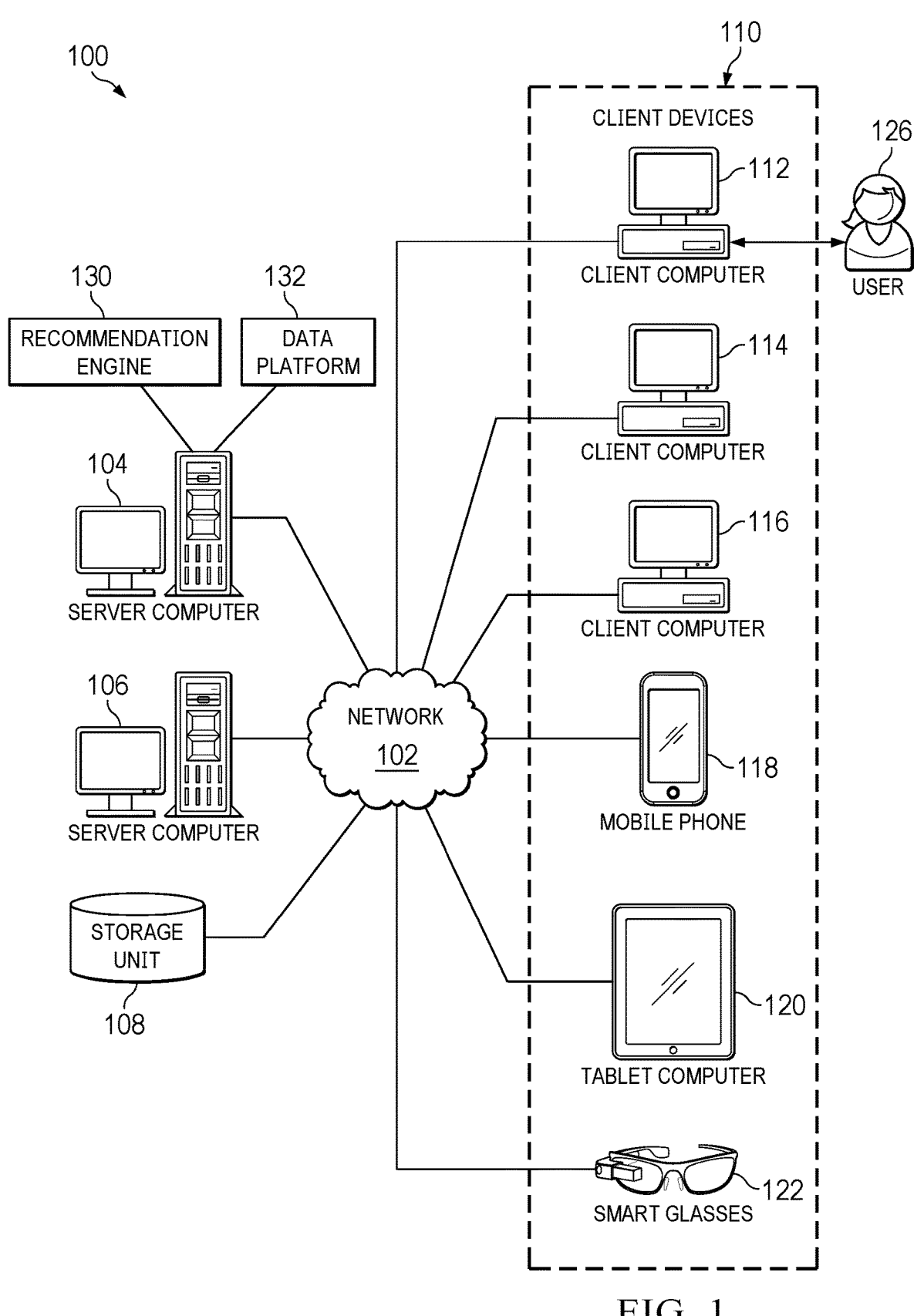
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, recommendation engine 130 can run on server computer 104. In another illustrative example, recommendation engine 130 can be run in a remote location such as on client computer 114 and can take the form of a system instance of an application. In yet other illustrative examples, recommendation engine 130 can be distributed in multiple locations within network data processing system 100. For example, recommendation engine 130 can run on client computer 112 and on client computer 114 or on client computer 112 and server computer 104 depending on the particular implementation.

Recommendation engine 130 can operate as part of data platform 132. Data platform 132 is a machine learning platform that enables user 126 to blend their own proprietary data set with one or more data sets provided by the platform. The datasets are standardized by establishing connection points according to an ontology. By standardizing and connecting the datasets, data platform 132 can provide machine learning models, previously trained on the platform specific datasets, but which user 126 can augment, further training the existing models to make appropriate modifications as needed.

Recommendation engine 130 operates to observe interactions with the data platform 132 and learn appropriate data models and visualizations for showcasing the imported data. Recommendation engine 130 provides a learning framework that characterizes the imported datasets, what type of models are being executed, and what visualizations are used to display outputs. When trained based on the interactions of user 126 with the data platform 132, recommendation engine 130 can provide recommendations based on the data sets that are imported, including different types of models that are suitable for the data set, what connection points that needs to be established for standardizing the data set, and visualizations for showcasing model output in an appropriate fashion.

Figure 2:
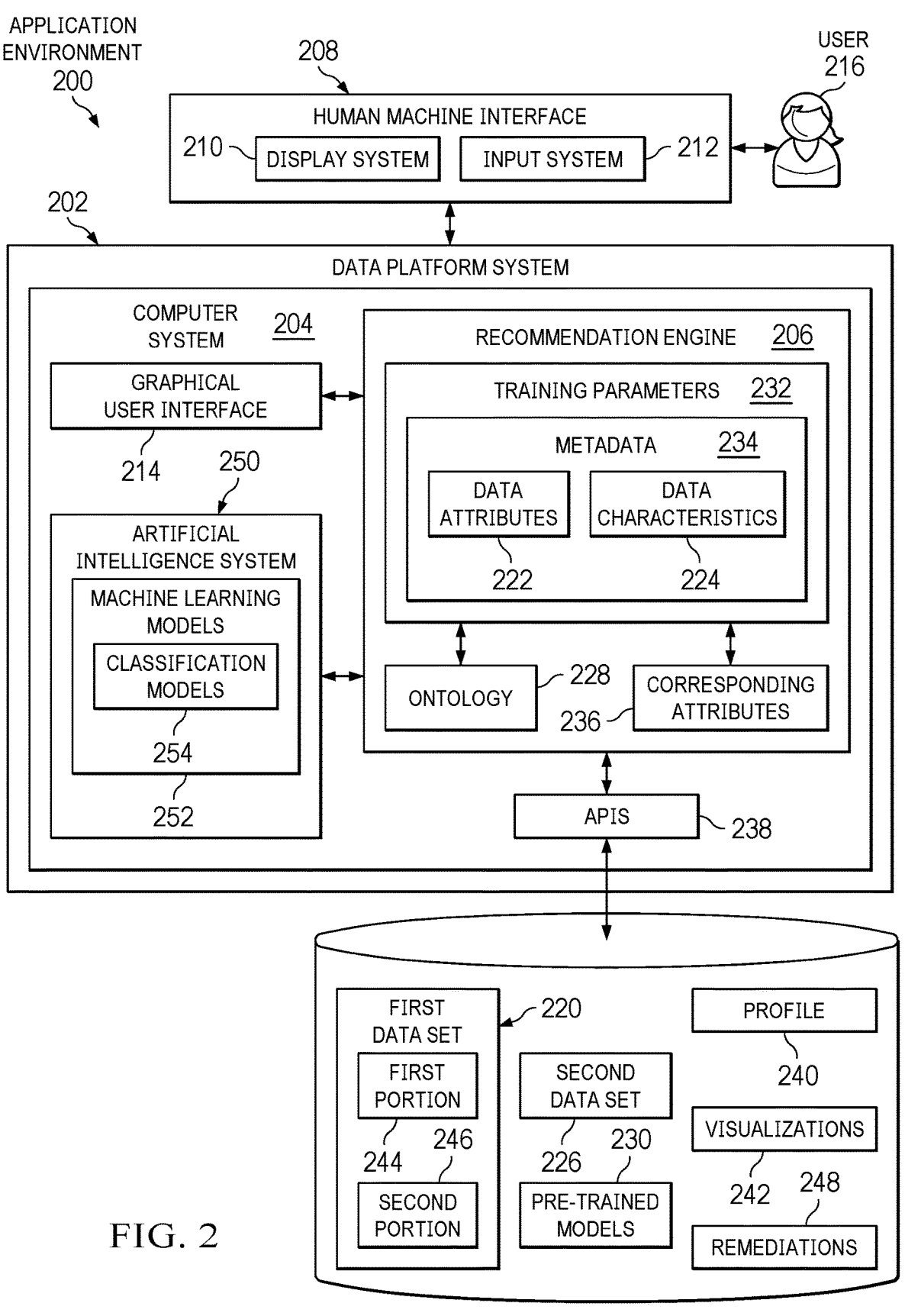
FIG. 2 is a block diagram of an application environment for dynamically modeling multi-tenant data in a machine learning platform in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

As depicted, data platform system 202 comprises computer system 204 and recommendation engine 206. recommendation engine 206 runs in computer system 204. Recommendation engine 206 can be implemented in software, hardware, firmware, or a combination thereof. When software is used, the operations performed by recommendation engine 206 can be implemented in program code configured to run on hardware, such as a processor unit. When firmware is used, the operations performed by recommendation engine 206 can be implemented in program code and data and stored in persistent memory to run on a processor unit. When hardware is employed, the hardware may include circuits that operate to perform the operations in recommendation engine 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In one or more illustrative embodiments, graphical user interface 214 solves problems of prior graphical user interface devices (GUIs), in the context of insights and visualizations, relating to speed, accuracy, and usability. Rather than reciting a mathematical algorithm, a fundamental economic or longstanding commercial practice, or a challenge in business, graphical user interface 214 improves on existing graphical user interface devices that do not have a pre-electronic machine learning insight analog. The embodiments of graphical user interface 214 provide significantly more than prior graphical user interface devices that merely allow for setting, displaying, and selecting data or information that is visible on a graphical user interface device. Instead, graphical user interface 214 utilizes a specific structured interface directly related to a prescribed functionality that resolves a specifically identified problem.

Furthermore, the specific structure and concordant functionality of graphical user interface 214 distinguishes this system as compared to conventional computer implementations of known procedures. The function of graphical user interface 214 is not simply the generalized use of computer system 204 as a tool to conduct a known or obvious process. Instead, graphical user interface 214 provides an inventive concept that allows users to visualize data insights more efficiently and accurately in imported datasets using data platform system 202. Rather than the routine or conventional use of computers or the Internet, graphical user interface 214 overcomes problems that are necessarily rooted in computer technology and that specifically arise in the realm of computer networks, resulting in an improvement to the capabilities of data platform system 202.

In this illustrative example, human machine interface 208 can enable user 216 to interact with one or more computers or other types of computing devices in computer system 204. For example, these computing devices can be client devices such as client devices 110 in FIG. 1.

In this illustrative example, recommendation engine 206 in computer system 204 is configured to dynamically model multi-tenant data in a machine learning platform. Recommendation engine 206 receives a first data set 220 from user 216. First data set 220 can be received, for example, via an appropriate data sharing mechanism, such as but not limited to, a web-based cloud storage service, such as Snowflake or Simple Storage Service (S3), as well as via an appropriate application programming interface (API).

Recommendation engine 206 characterizes the first data set 220 to determine data attributes 222 and data characteristics 224 of the first data set. As used herein, "data characterization" is a technique for transforming raw data into useful, condensed representations that can be used as a means of measuring and tracking events, changes, and new emergent behaviors in large dynamic data streams. As depicted, the characterization can be metadata 234, and stored in association with first data set 220.

Recommendation engine 206 aligns the data attributes 222 of the first data set 220 with a second data set 226 according to an ontology 228. Ontology 228 defines the terms used to describe and represent an area of knowledge, such as represented in second data set 226. Ontological terms are concepts and properties which capture the knowledge of a domain area. Concepts are organized in a hierarchy that expresses the relationships among them by means of superclasses representing higher level concepts, and subclasses representing specific (constrained) concepts. Properties are of two types: those that describe attributes (features) of the concepts, and those that introduce binary relations between the concepts.

Based on the data characteristics 224 of the first data set 220, recommendation engine 206 identifies a set of pre-trained models 230 that was trained from training parameters 232 selected from data attributes 222 and data characteristics 224 of a second data set 226. Recommendation engine 206 recommends the set of pre-trained models 230 to the user 216.

In some illustrative examples, recommendation engine 206 can use artificial intelligence system 250. Artificial intelligence system 250 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 250 can include a set of machine learning models 252. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

Classification algorithms are used to divide a dataset into classes based on different parameters. The task of the classification algorithm is to find a mapping function to map an input (x) to a discrete output (y). In other words, classification algorithms are used to predict the discrete values for the classifications, such as Male or Female, True or False, Spam or Not Spam, etc. Types of Classification Algorithms include Logistic Regression, K-Nearest Neighbors, Support Vector Machines (SVM), Kernel SVM, Naïve Bayes, Decision Tree Classification, and Random Forest Classification.

In one illustrative example, recommendation engine 206 utilizes a classification model 254, trained on a second data set 226. Classification model 254 models a probabilistic relationship between observed values such as data attributes 222 and data characteristics 224, and discrete outcomes, such as one or more pre trained models 230 and visualizations 242.

In an illustrative example, recommendation engine 206 in computer system 204 characterizes the first data set 220. Recommendation engine 206 generates a first metadata in metadata 234 based on the data characteristics 224 of the first data set 220. Recommendation engine 206 compares the first metadata in metadata 234 to a second metadata in metadata 234, for example, using classification model 254. Recommendation engine 206 identifies the set of pre-trained models 230 based on the comparing, according to a classification predicted by classification model 254.

In an illustrative example, recommendation engine 206 in computer system 204 aligns the data attributes 222 of the first data set 220 with the second data set 226. Recommendation engine 206 identifies data attributes 222 that correspond between the first data set 220 with the second data set 226. These corresponding attributes can serve as connection points for aligning the datasets. Recommendation engine

206 them standardizes the first data set 220 with the second data set 226 according to the ontology 228 through one or more APIs 238.

In an illustrative example, recommendation engine 206 in computer system 204 identifies the set of pre-trained models 230. Recommendation engine 206 characterizes a profile 240 of the user to determine data characteristics of the profile. Recommendation engine 206 identifies the set of pre-trained models based on the data characteristics of the first data set 220 and the data characteristics of the profile 240.

In an illustrative example, recommendation engine 206 identifies a set of visualizations 242 for displaying the first data set 220. Recommendation engine 206 identifies the set of visualizations 242 based on the data characteristics 224 of the first data set 220 and the set of pre-trained models 230 that were identified. Recommendation engine 206 recommends the set of visualizations 242 to the user 216.

In an illustrative example, recommendation engine 206 validates the model that was selected with a first portion 244 of the first data set 220 in response to selection of a model. Recommendation engine 206 determines whether the model performs to a desired level of accuracy.

Continuing with the current example, in response to determining that the model does not perform to a desired level of accuracy, recommendation engine 206 performs one or more remediations 248. For example, recommendation engine 206 may further train the model that was selected according to a second portion 246 of the first data set 220; recommend one or more alternative training parameters 232 based on the data characteristics 224 of the data set; recommend one or more alternative machine learning models 252; further train the one or more alternative model according to the second portion 246 of the first data set 220; and recommend one or more alternative visualizations 242. In response to a receiving a response to a remediation, the response to the remediation is provided as additional training data to the recommendation engine in a feedback learning loop such that the recommendation engine takes the remediation into account when generating subsequent recommendations.

In one illustrative example, one or more solutions are present that overcome a problem with providing assistance to use features in applications. As a result, one or more illustrative examples may provide assistance in the form of visual guidance. This visual guidance is dynamically generated in a manner that provides the visual guidance in a context of a current usage of a user instance of an application by a user. For example, users less skilled at using software-based applications, such as young people and people with little or no exposure to particular applications, can benefit from viewing visual guidance.

Further, the visual guidance provided in the illustrative examples can provide improved guidance to users who may learn by visually seeing the performance of steps for a feature from the current state of the user instance of the application. Visual guidance can be provided using the current context of the graphical user interface to avoid a user having to adapt or understand how the steps can be performed with respect to the current context of the graphical user interface. In other words, the visual guidance can include the same windows, colors, resolution, and other graphical features in graphical user interface 214 that is currently present for user 216 using a user instance of an application.

Computer system 204 can be configured to perform at least one of the steps, operations, or actions described in the different illustrative examples using software, hardware, firmware, or a combination thereof. As a result, computer system 204 operates as a special purpose computer system in recommendation engine 206 in computer system 204. In particular, recommendation engine 206 transforms computer system 204 into a special purpose computer system as compared to currently available general computer systems that do not have recommendation engine 206. In this example, computer system 204 operates as a tool that can increase at least one of speed, accuracy, or usability of computer system 204. In particular, this increase in performance of computer system 204 can be for the use of a user instance of an application by user 216. In one illustrative example, visual guidance provides for increased comprehension and speed at which features can be learned by user 216 as compared with using current documentation systems.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figures 3, 4:
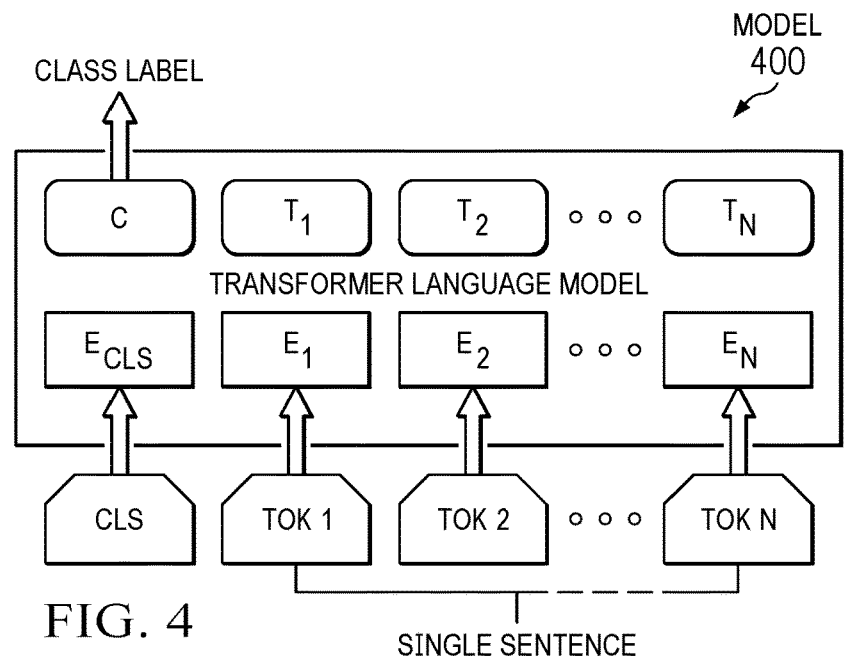
FIG. 3 is a block diagram of an architecture of an artificial intelligence model to classify an entity is depicted in accordance with an illustrative embodiment.
FIG. 4 is a task-specific classification model is depicted in accordance with an illustrative embodiment.

With reference next to FIG. 3, an architecture of an artificial intelligence model to classify an entity is depicted in accordance with an illustrative embodiment. Architecture 300 is an example of an architecture used to make one or more artificial intelligence models. In the illustrative examples, the same reference numeral may be used in more than one figure. This reuse of a reference numeral in different figures represents the same element in the different figures.

As used herein, a "sentence" can be an arbitrary span of contiguous text, rather than an actual linguistic sentence. A "sequence" refers to the input token sequence to BERT, which may be a single sentence or multiple sentences packed together.

Embeddings 310 are vector representation of words in the natural language descriptions found in documents. In architecture 300, each of embeddings 310 is a combination of three embeddings: positional embeddings to express the position of words in a sentence, segment embedding to distinguish between sentence pairs, and token embeddings learned for the specific token from a training corpus token vocabulary.

Embeddings 310 of the input sequence are passed to all the transformers 312 in a first layer of the stack. The embeddings are then transformed and propagated to additional transformers in a next layer (not shown) of the stack. The output from the last encoder in the encoder-stack is passed to all the decoders 314 in the decoder-stack, which output the final contextualized representation 316 of each input word.

Turning now to FIG. 4, a task-specific classification model is depicted in accordance with an illustrative embodiment. Model 400 is one example of architecture 300 of FIG. 3.

Model 400 is a sequence-level task for classifying a single sentence. As depicted, E represents the input embedding, such as embeddings 310 of FIG. 3. T represents the contextual representation of a token, such as contextual representation 316 of FIG. 3. CLS is the special symbol for classification output.

Turning next to FIG. 5, a flowchart of a process for dynamically modeling multi-tenant data in a machine learning platform is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in recommendation engine 206 in computer system 204 in FIG. 2.

The process begins by receiving a first data set from a user (step 510). The process characterizes the first data set to determine data attributes and data characteristics of the first data set (step 520). The process aligns the data attributes of the first data set with a second data set according to an ontology (step 530).

Based on the data characteristics of the first data set, the process identifies a set of pre-trained models that was trained from training parameters selected from data attributes and data characteristics of a second data set (step 540). The process recommends the set of pre-trained models to the user (step 550). The process terminates thereafter.

With reference next to FIG. 6, a flowchart of a process for characterizing a first data set is depicted in accordance with an illustrative embodiment. The process in FIG. 6 is an example one implementation for step 520 in FIG. 5.

Continuing from step 510 of FIG. 5, the process generates a first metadata based on the data characteristics of the first data set (step 610). The process compares the first metadata to a second metadata, wherein the set of pre-trained models is identified based on the comparing (step 620). Thereafter, the process continues to step 530 of FIG. 5.

With reference next to FIG. 7, a flowchart of a process for aligning data attributes of a first data set with a second data set is depicted in accordance with an illustrative embodiment. The process in FIG. 7 is an example one implementation for step 530 in FIG. 5.

Continuing from step 520 of FIG. 5, the process identifies corresponding attributes between the first data set with the second data set (step 710). The process standardizes the first data set with the second data set according to the ontology through one or more APIs (step 720). Thereafter, the process continues to step 540 of FIG. 5.

With reference next to FIG. 8, a flowchart of a process for identifying a set of pre trained models is depicted in accordance with an illustrative embodiment. The process in FIG. 7 is an example one implementation for step 540 in FIG. 5.

Continuing from step 530 of FIG. 5, the process characterizes a profile of the user to determine data characteristics of the profile (step 810). The process identifies a set of pre-trained models based on the data characteristics of the first data set and the data characteristics of the profile (step 820). Thereafter, the process may continue to step 550 of FIG. 5.

Figure 9:
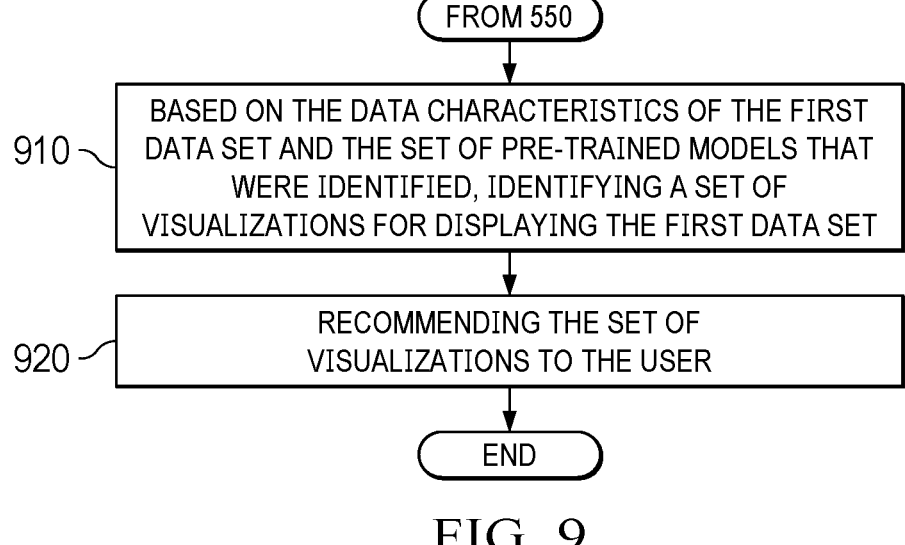
FIG. 9 is a flowchart of a process for recommending a set of visualizations in accordance with an illustrative embodiment.

With reference next to FIG. 9, a flowchart of a process for recommending a set of visualizations is depicted in accordance with an illustrative embodiment. The process in FIG. 9 is an example additional processing steps that can be implemented in conjunction with the process illustrated in FIG. 5.

Continuing from step 550 of FIG. 5, based on the data characteristics of the first data set and the set of pre-trained models that were identified, the process identifies a set of visualizations for displaying the first data set (step 910). The process recommends the set of visualizations to the user (step 920). Thereafter, the process terminates.

Figure 10:
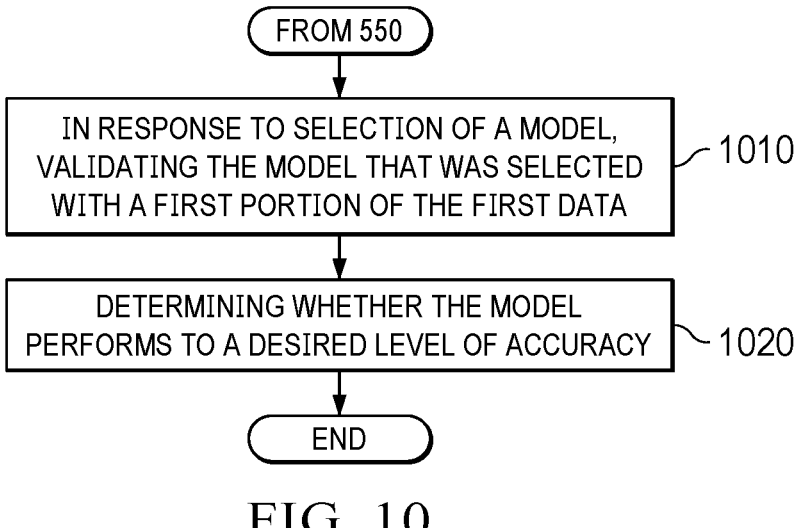
FIG. 10 is a flowchart of a process for determining model performance in accordance with an illustrative embodiment.

With reference next to FIG. 10, a flowchart of a process for determining model performance is depicted in accordance with an illustrative embodiment. The process in FIG. 10 is an example additional processing steps that can be implemented in conjunction with the process illustrated in FIG. 5.

Continuing from step 550 of FIG. 5, in response to selection of a model, the process validates the model that was selected with a first portion of the first data (step 1110). The process determines whether the model performs to a desired level of accuracy (step 1120).

With reference next to FIG. 11, a flowchart of a process for capturing a set of actions is depicted in accordance with an illustrative embodiment. The process in FIG. 11 is an example additional processing steps that can be implemented in conjunction with the processes illustrated in FIG. 5 and FIG. 10.

Continuing from step 1020 of FIG. 10, in response to determining that the model does not perform to a desired level of accuracy, the process performs one or more remediations (step 1110).

In one illustrative example, the remediations can include further training the model that was selected according to a second portion of the first data set (step 1120).

In one illustrative example, the remediations can include recommending one or more alternative training parameters based on the data characteristics of the data set (step 1130).

In one illustrative example, the remediations can include recommending one or more alternative models (step 1140).

In one illustrative example, the remediations can include further training the one or more alternative model according to the second portion of the first data set (step 1150).

In one illustrative example, the remediations can include recommending one or more alternative visualizations (step 1160). Thereafter, the process terminates.

With reference next to FIG. 12, a flowchart of a process for capturing a set of actions is depicted in accordance with an illustrative embodiment. The process in FIG. 12 is an example additional processing step that can be implemented in conjunction with the processes illustrated in FIG. 5, FIG. 10, and FIG. 11.

Continuing from step 1110 of FIG. 11, in response to a receiving a response to a remediation, the process provides the remediation as additional training data to the recommendation engine in a feedback learning loop such that the recommendation engine takes the remediation into account when generating subsequent recommendations (step 1210). Thereafter, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 13:
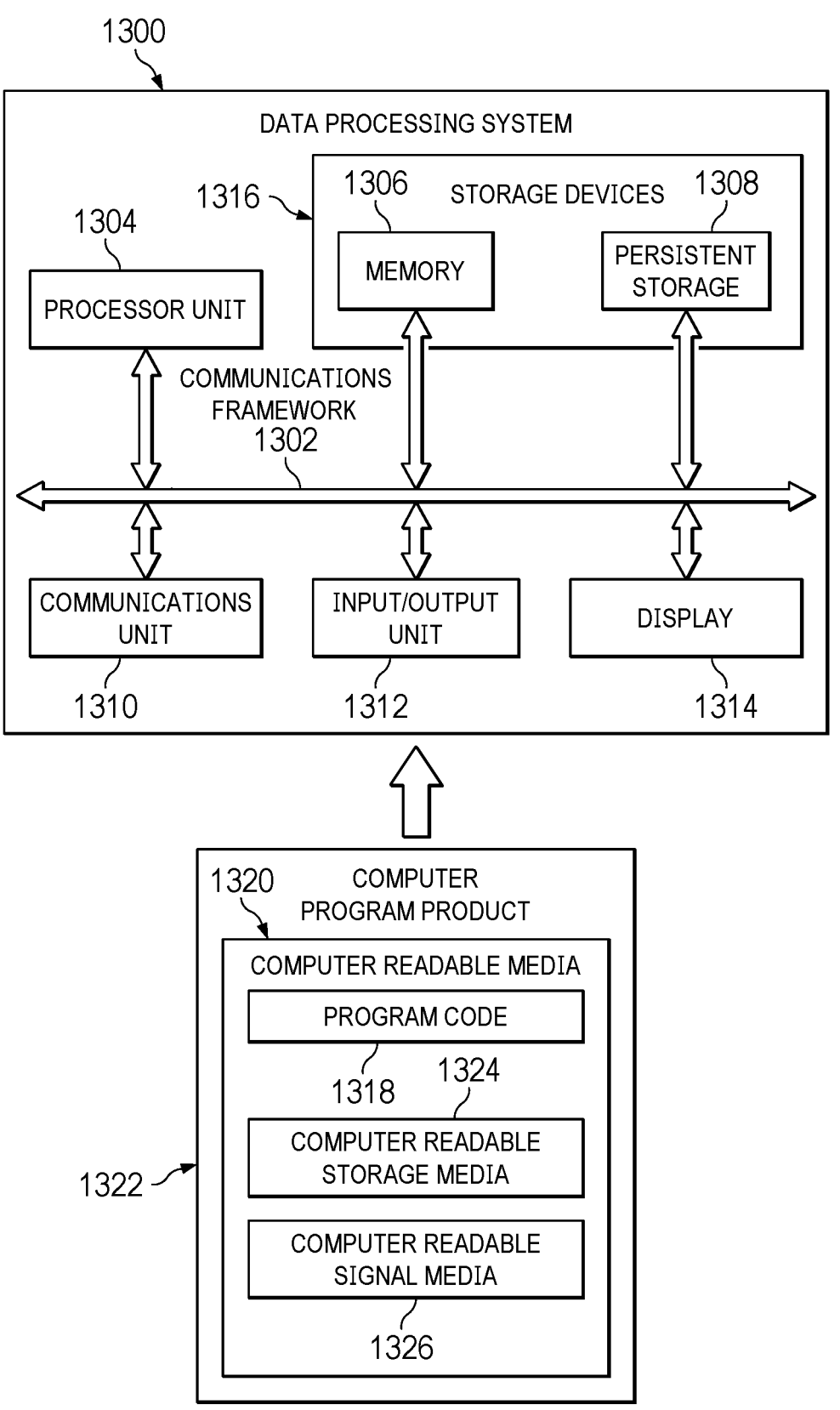
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, client devices 110, in FIG. 1. Data processing system 1300 can also be used to implement computer system 204 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are program instructions and are also referred are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318. Computer-readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 1318 can be transferred to data processing system 1300 using a computer-readable signal media. The computer-readable signal media are signals and can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program code 1318 can be located in computer-readable media 1320 in the form of a single storage device or system. In another example, program code 1318 can be located in computer-readable media 1320 that is distributed in multiple data processing systems. In other words, some instructions in program code 1318 can be located in one data processing system while other instructions in program code 1318 can be located in one data processing system. For example, a portion of program code 1318 can be located in computer-readable media 1320 in a server computer while another portion of program code 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, the illustrative embodiments of the present invention provide a computer-implemented method, computer system, and computer program product for dynamically modeling multi-tenant data in a machine learning platform. A recommendation engine receives a first data set from a user. The recommendation engine characterizes the first data set to determine data attributes and data characteristics of the first data set. The recommendation engine aligns the data attributes of the first data set with a second data set according to an ontology. Based on the data characteristics of the first data set, the recommendation engine identifies a set of pre-trained models that was trained from training parameters selected from data attributes and data characteristics of a second data set. The recommendation engine recommends the set of pre-trained models to the user.

The illustrative examples can be used to blend a user's own proprietary data set with one or more data sets provided by a machine learning platform. The datasets are standardized by establishing connection points according to an ontology. By standardizing and connecting the datasets, the illustrative examples can provide machine learning models, previously trained on the platform specific datasets, but which user can augment, further training the existing models to make appropriate modifications as needed.

As a result, the illustrative examples can provide a recommendation engine that operates to observe user interactions with a data platform and learn appropriate data models and visualizations for showcasing imported data. The illustrative examples provide a learning framework that characterizes the imported datasets, what type of models are being executed, and what visualizations are used to display outputs. When trained based on the interactions of a user with the data platform, the recommendation engine can provide recommendations based on imported data sets, including different types of models that are suitable for the data set, what connection points that needs to be established for standardizing the data set, and visualizations for showcasing model output in an appropriate fashion.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for dynamically modeling multi-tenant data in a machine learning platform, the method comprising:

receiving, by a computer system via a data sharing interface, a first data set from a user;

transforming the first data set to condensed metadata by characterizing, by the computer system, the first data set to determine data attributes and data characteristics of the first data set;

aligning, by the computer system using the condensed metadata to standardize the first data set, the data attributes of the first data set with a second data set stored in a data storage according to an ontology through one or more application programming interfaces;

identifying, by a recommendation engine in the computer system, based on the data characteristics of the first data set, a set of pre-trained models stored in a data repository that was trained from training parameters selected from data attributes and data characteristics of a second data set;

based on the data characteristics of the first data set and the set of pre-trained models that were identified, identifying, by the recommendation engine, a set of visualizations for displaying the first data set; and recommending, by the recommendation engine, the set of visualizations to the user.

2. The method of claim 1, wherein characterizing the first data set further comprises:

generating, by the recommendation engine, a first metadata based on the data characteristics of the first data set; and comparing, by the recommendation engine, the first metadata to a second metadata, wherein the set of pre-trained models is identified based on the comparing.

3. The method of claim 1, wherein aligning the data attributes of the first data set with the second data set further comprises:

identifying, by the recommendation engine, corresponding attributes between the first data set with the second data set; and standardizing, by the recommendation engine, the first data set with the second data set according to the ontology through one or more application programming interfaces.

4. The method of claim 1, wherein identifying the set of pre-trained models further comprises:

characterizing, by the recommendation engine, a profile of the user to determine data characteristics of the profile; and identifying the set of pre-trained models based on the data characteristics of the first data set and the data characteristics of the profile.

5. The method of claim 1, further comprising:

recommending, by the recommendation engine, the set of pre-trained models to the user.

6. The method of claim 1, further comprising:

in response to selection of a model, validating, by the recommendation engine, the model that was selected with a first portion of the first data; and determining, by the recommendation engine, whether the model performs to a desired level of accuracy.

7. The method of claim 6, further comprising:

in response to determining that the model does not perform to a desired level of accuracy, performing one or more remediations selected from a group of remediations consisting of:

further training the model that was selected according to a second portion of the first data set;

recommending one or more alternative training parameters based on the data characteristics of the data set; and recommending one or more alternative models;

further training the one or more alternative model according to the second portion of the first data set; and recommending one or more alternative visualizations.

8. The method of claim 7, further comprising:

in response to receiving a response to the remediation, providing the remediation as additional training data to the recommendation engine in a feedback learning loop such that the recommendation engine takes the remediation into account when generating subsequent recommendations.

9. A computer system for dynamically modeling multi-tenant data in a machine learning platform, the computer system comprising:

a storage device configured to store program instructions; and one or more processors operably connected to the storage device and configured to execute the program instructions to cause the system to perform a method comprising:

receiving a first data set from a user via a data sharing interface;

transforming the first data set to condensed metadata by characterizing the first data set to determine data attributes and data characteristics of the first data set;

aligning, by using the condensed metadata to standardize the first data set, the data attributes of the first data set with a second data set according to an ontology;

identifying, based on the data characteristics of the first data set, a set of pre-trained models that was trained from training parameters selected from data attributes and data characteristics of a second data set;

based on the data characteristics of the first data set and the set of pre-trained models that were identified, identifying a set of visualizations for displaying the first data set; and recommending the set of visualizations to the user.

10. The computer system of claim 9, wherein characterizing the first data set further comprises:

generating, by the recommendation engine, a first metadata based on the data characteristics of the first data set; and comparing, by the recommendation engine, the first metadata to a second metadata, wherein the set of pretrained models is identified based on the comparing.

11. The computer system of claim 9, wherein aligning the data attributes of the first data set with the second data set further comprises:

identifying, by the recommendation engine, corresponding attributes between the first data set with the second data set; and standardizing, by the recommendation engine, the first data set with the second data set according to the ontology through one or more application programming interfaces.

12. The computer system of claim 9, wherein identifying the set of pre-trained models further comprises:

characterizing, by the recommendation engine, a profile of the user to determine data characteristics of the profile; and identifying the set of pre-trained models based on the data characteristics of the first data set and the data characteristics of the profile.

13. The computer system of claim 9, further comprising: recommending the set of pre-trained models to the user.

14. The computer system of claim 9, further comprising:

in response to selection of a model, validating, by the recommendation engine, the model that was selected with a first portion of the first data; and determining, by the recommendation engine, whether the model performs to a desired level of accuracy.

15. The computer system of claim 14, further comprising:

in response to determining that the model does not perform to a desired level of accuracy, performing one or more remediations selected from a group of remediations consisting of:

further training the model that was selected according to a second portion of the first data set;

recommending one or more alternative training parameters based on the data characteristics of the data set; and recommending one or more alternative models;

further training the one or more alternative model according to the second portion of the first data set; and recommending one or more alternative visualizations.

16. The computer system of claim 15, further comprising:

in response to receiving a response to the remediation, providing the remediation as additional training data to the recommendation engine in a feedback learning loop such that the recommendation engine takes the remediation into account when generating subsequent recommendations.

17. A computer program product for dynamically modeling multi-tenant data in a machine learning platform, the computer program product comprising:

a computer-readable storage medium having program instructions embodied thereon to perform the steps of:

receiving a first data set from a user via a data sharing interface;

transforming the first data set to condensed metadata by characterizing the first data set to determine data attributes and data characteristics of the first data set;

aligning, by using the condensed metadata to standardize the first data set, the data attributes of the first data set with a second data set according to an ontology;

identifying, based on the data characteristics of the first data set, a set of pre-trained models that was trained from training parameters selected from data attributes and data characteristics of a second data set;

based on the data characteristics of the first data set and the set of pre-trained models that were identified, identifying, by the recommendation engine, a set of visualizations for displaying the first data set; and recommending, by the recommendation engine, the set of visualizations to the user.

18. The computer program product of claim 17, wherein characterizing the first data set further comprises:

generating, by the recommendation engine, a first metadata based on the data characteristics of the first data set; and comparing, by the recommendation engine, the first metadata to a second metadata, wherein the set of pretrained models is identified based on the comparing.

19. The computer program product of claim 17, wherein aligning the data attributes of the first data set with the second data set further comprises:

identifying, by the recommendation engine, corresponding attributes between the first data set with the second data set; and standardizing, by the recommendation engine, the first data set with the second data set according to the ontology through one or more application programming interfaces.

20. The computer program product of claim 17, wherein identifying the set of pre-trained models further comprises:

characterizing, by the recommendation engine, a profile of the user to determine data characteristics of the profile; and identifying the set of pre-trained models based on the data characteristics of the first data set and the data characteristics of the profile.

21. The computer program product of claim 17, further comprising:

recommending the set of pre-trained models to the user.

22. The computer program product of claim 17, further comprising:

in response to selection of a model, validating, by the recommendation engine, the model that was selected with a first portion of the first data; and determining, by the recommendation engine, whether the model performs to a desired level of accuracy.

23. The computer program product of claim 22, further comprising:

in response to determining that the model does not perform to a desired level of accuracy, performing one or more remediations selected from a group of remediations consisting of:

further training the model that was selected according to a second portion of the first data set;

recommending one or more alternative training parameters based on the data characteristics of the data set; and recommending one or more alternative models;

further training the one or more alternative model according to the second portion of the first data set; and recommending one or more alternative visualizations.

24. The computer program product of claim 23, further comprising:

in response to receiving a response to the remediation, providing the remediation as additional training data to the recommendation engine in a feedback learning loop such that the recommendation engine takes the remediation into account when generating subsequent recommendations.

* * * * *